United States Patent [19]

Arquati

[11] Patent Number: 4,655,010
[45] Date of Patent: Apr. 7, 1987

[54] SUPPORT FRAME FOR AN AWNING HAVING A ONE-PIECE FABRIC COVER

[76] Inventor: Ettore Arquati, Via Caduti del Lavoro, 31, 43044 Collecchio (Parma), Italy

[21] Appl. No.: 752,247

[22] Filed: Jul. 3, 1985

[30] Foreign Application Priority Data

Jul. 3, 1984 [IT] Italy .............................. 21736 A/84

[51] Int. Cl.$^4$ ...................... E04H 15/58; E04F 10/06; A47H 3/10; F16C 11/10
[52] U.S. Cl. ............................................ 52/63; 52/90; 160/66; 160/266; 403/91; 403/403
[58] Field of Search ...................... 160/66, 68, 69, 46, 160/266; 52/74, 63; 403/403, 91, 65

[56] References Cited

U.S. PATENT DOCUMENTS

| | | | |
|---|---|---|---|
| 166,618 | 8/1875 | Luesenhop | 160/46 |
| 330,956 | 11/1885 | Brenner | 160/68 |
| 602,772 | 4/1898 | Richards | 160/69 |
| 618,906 | 2/1899 | Reimer | 160/67 |
| 1,556,915 | 10/1925 | Cooley | 160/68 |
| 3,991,805 | 11/1976 | Clauss | 160/68 |
| 4,301,851 | 11/1981 | Gitkin | 160/66 |
| 4,509,576 | 4/1985 | Giovanni | 160/66 |
| 4,530,389 | 7/1985 | Quinn et al. | 160/46 |

FOREIGN PATENT DOCUMENTS

| | | | |
|---|---|---|---|
| 2459995 | 7/1975 | Fed. Rep. of Germany | 160/68 |
| 2022184 | 12/1979 | United Kingdom | 160/46 |

*Primary Examiner*—Carl D. Friedman
*Assistant Examiner*—Michael Safavi
*Attorney, Agent, or Firm*—Bucknam and Archer

[57] ABSTRACT

A support frame for an awning having a cover made from a single piece of fabric (13), has the peculiarity of comprising support brackets (1) for attachment to a support structure such as a wall or a ceiling, the brackets (1) supporting a square bar (2) on which are carried attachment elements (3) fitted to the ends of guides (4) on which are slidable carriages (10) for displacement of an awning cover draw bar (12) attached at or ajacent to one end of the awning cover (13). The draw bar (12) overlies the said guides (4) over the whole of its longitudinal length so that a single piece of fabric can be used for the awning (13) even if the frame has several spans. At its other end the awning fabric (13) is wound on a wind up roller (14) rotatably supported by arms (15) connected to the square bar (2).

4 Claims, 3 Drawing Figures

SUPPORT FRAME FOR AN AWNING HAVING A ONE-PIECE FABRIC COVER

BACKGROUND OF THE INVENTION

The present invention relates generally to a support frame for an awning, and particularly a support frame for a wide awning having a one-piece fabric cover.

As is known, awnings or curtains generally utilised for the covering of balconies or other open spaces, are generally constituted by a plurality of guides on which the awning fabric or covering is supported, the awning fabric being connected to a draw bar supported by carriages slidable on suitable guides.

In the known constructions the guides are directly fixed to the walls or the ceiling thus creating difficulties in the accurate positioning of these whenever irregularities in the walls are encountered, and very often difficulties are met in fixing the guides at this point.

Another disadvantage is constituted by the fact that in situations where it is required to have very wide covers, it is necessary at present to utilise awnings constituted by several separate fabric sheets, disposed alongside one another, with the disadvantage of inevitably having a zone, even if only narrow, which remains open between the adjacent edges of two contiguous fabric pieces, thus making it necessary to provide cover strips or other covering elements to close the otherwise open zones.

In awnings of the known type considerable difficulties are encountered in motorising the curtain since in many cases suitable guides for allowing motorising of the curtains are not already provided or installed.

A further disadvantage is constituted by the fact that in the case in which curves on the guides must be provided, the point of curvature is generally a very critical point, which is currently formed by utilising fixed curves which do not offer the possibility of continuously varying the mutual inclination of the guides connected to the curves.

SUMMARY OF THE INVENTION

The present invention seeks to overcome the previously mentioned disadvantages by providing a support frame for an awning which allows a fabric cover made in only one piece to be employed, even if the frame has several spans, thereby avoiding the occurrence of gaps between adjacent awning cover pieces and having the possibility of extending or retracting the awning cover with only a single operating action.

A particular advantage of the invention is that it provides a support frame for an awning, which permits the guides to be accurately positioned regardless of whether the frame is connected to the ceiling or the walls, and despite any irregularities in the fixings, thereby making the mounting of the frame considerably simpler and quicker than has hithertofore been the case.

A further advantage of the present invention is that it provides a supporting frame which can be used equally well whether or not the awning cover movement is motorised, in that the guides which are used are already provided with means for the introduction of the necessary components for performing a motorised awning drawing operation.

Another advantage of the present invention is that it provides a support frame including a curved guide track portion the curvature of which is adjustable in a simple manner thereby offering the possibility of easily adapting it to all the possible configurations which may be encountered upon installation.

According to the present invention a support frame for an awning having a one-piece awning cover is characterised by the fact that it comprises brackets for attachment to a support structure, which brackets support a square bar on which are positioned attachment carriers mounted at the ends of guides on which are slidable carriages for drawing a bar to which one end of an awning cover can be attached, the bar lying above the said guides over the whole of its longitudinal length to allow the use of a one-piece awning fabric, even if the frame has several spans; this awning fabric, at its other end, being wound on a wind-up roller rotatably supported by arms connected to the square bar.

The said draw bar lies above the guides, along the whole of its length, thus allowing utilisation of a one-piece awning, even if the frame has several spans.

A further advantage of the present invention is that it provides a support frame which, as well as being easily obtainable starting from elements which are readily commercially available, is of very low cost thereby making it commercially competitive.

BRIEF DESCRIPTION OF THE DRAWINGS

One embodiment of the present invention will now be more particularly described, by way of example, with reference to the accompanying drawings, in which.

DESCRIPTION OF THE PREFERRED EMBODIMENT

Figure 1:
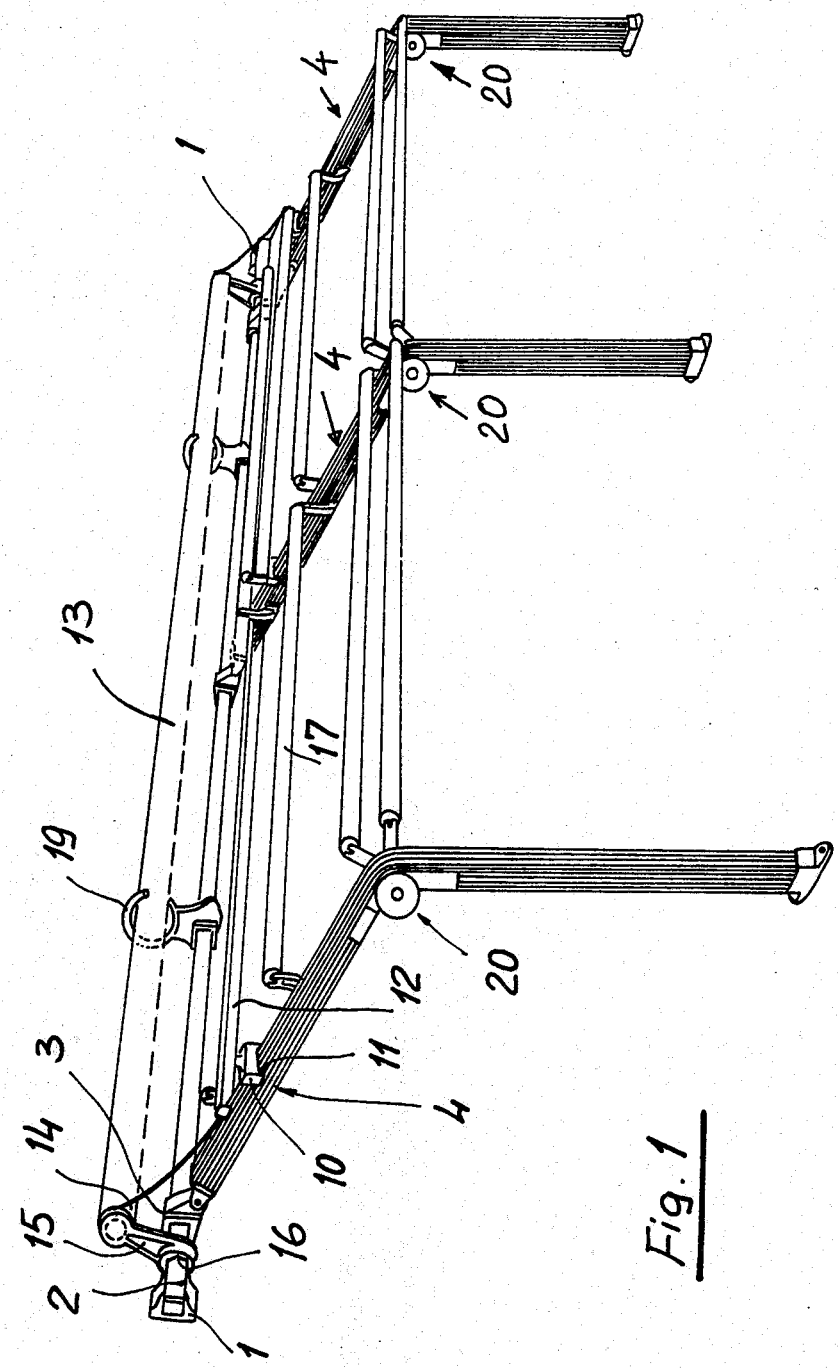
FIG. 1 is a schematic perspective view illustrating the awning support frame of the invention.

Referring now to the drawings, the support frame for wide awnings having a one-piece fabric, according to the invention, comprises mounting brackets 1 which can be fitted to the support structure which may be a wall or a ceiling. To the brackets 1 there is connected a square bar which extends substantially the whole of the width of the awning to be fitted.

Figure 2:
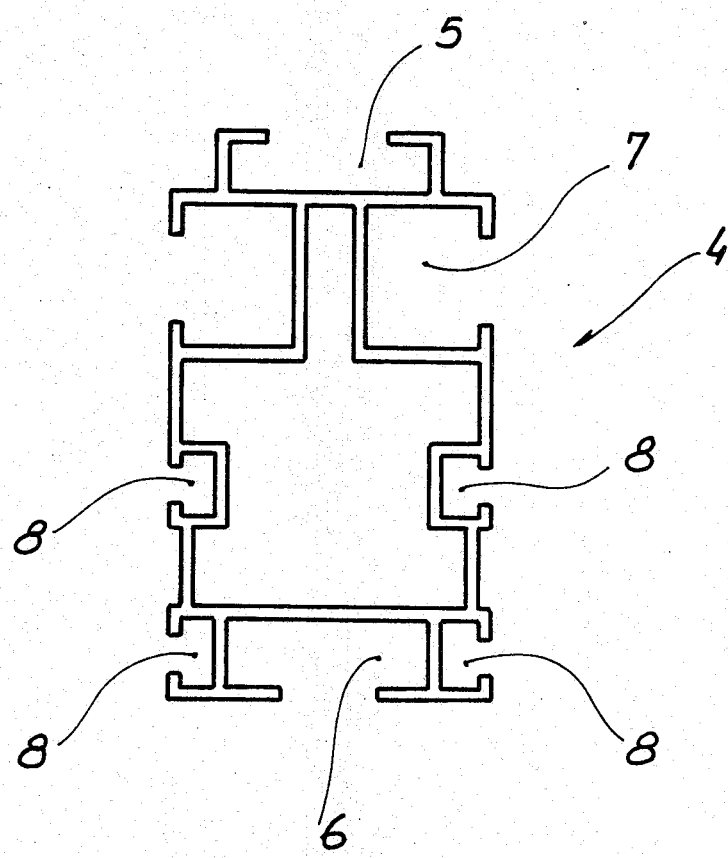
FIG. 2 is a cross section illustrating the shape of the guides.

On the square bar 2 there are fitted a number of guide carriers 3 (in FIG. 1 three such carriers are shown) which are pivotally connected to the upper end of respective guides generally indicated 4. The pivotal connection between the guides 4 and the carriers 3 which are supported by the square bar, offers the possibility of rendering the positioning of the guides themselves independent of the support elements for fixing to the walls or the ceiling, which is the opposite of the situation in the prior art. Each guide 4, as is clearer in FIG. 2, has a substantially rectangular body the upper and lower faces of which are formed with channels, indicated 5 and 6, for the sliding of possible drive belts for motorising the opening and closing movements or raising and lowering movements of the awning.

In the upper part there are further provided opposite lateral recesses 7 for the sliding of carriages which will be described in more detail hereinbelow, and in the lower part there are provided grooves 8 for the connection of fixing means which, again, will be described in more detail below.

On the guides 4 are slidable carriages 10 which are provided with rollers 11 which engage within the recesses 7. At their top the carriages 10 support an awning draw bar 12 which is connected to the end of the awning fabric, generally indicated with the reference numeral 13.

The described coupling of the carriages and the draw bar 12 is such that the bar 12 is always spaced from and above the guides 4 so that it is possible to utilise a single draw bar and, consequently, an awning cover or curtain 13 made from a single piece of fabric, even if the frame has several spans.

The awning cover 13, at its other end, is connected to a wind-up roller 14 which is rotatably supported by support arms 15 which are connected to the square bar 2 by means of a grooved hole 16 (splined) which gives the possibility of adjusting their inclination at will and, consequently, varying the position of the wind up roller 14.

The frame is completed by the presence of support rollers 17 which extend transversely of the guides 4 between the various spans, which are connected to the lateral grooves 8 in the guides and which serve the function of supporting the awning fabric to prevent undue bulges or unwanted displacements when it is windy.

Further, there are provided supports 19, which are connected to the square bar 2 and which engage the outer surface of the curtain wind-up roller 14 to prevent it from flexing.

Figure 3:
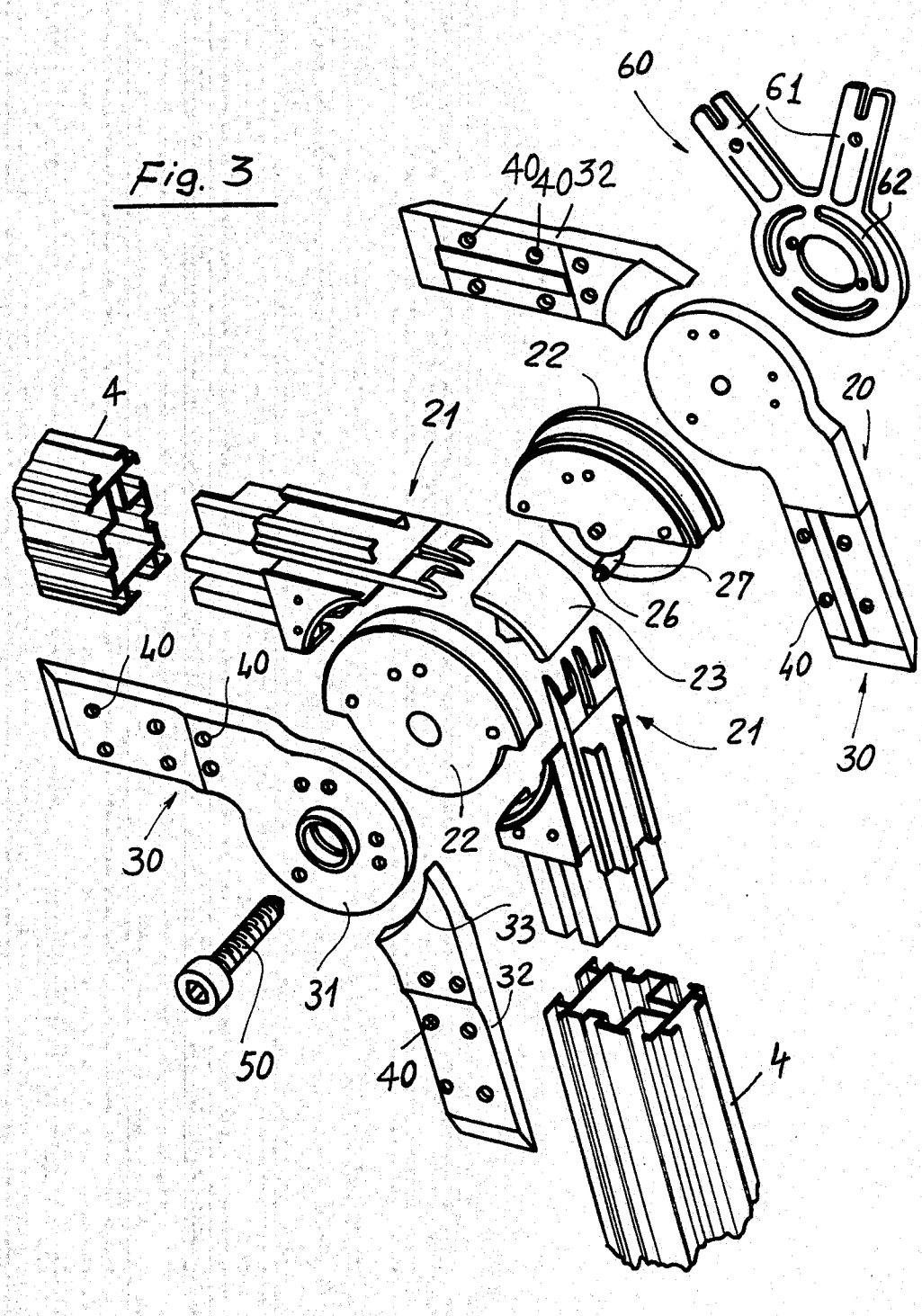
FIG. 3 is an exploded perspective view on a larger scale illustrating the component elements of the curves which can be fitted to the guides.

The guides 4 are provided with curves, generally indicated with the reference numeral 20, which have the important characteristic that their inclination is continuously adjustable, so that they perfectly join the line of the guides 4 without creating any element of interruption thereby. The curves 20, as will be seen in FIG. 3, which is an exploded view of a curve, have a pair of guide connectors indicated 21, which can be inserted into the interior of the section constituting the guide 4, and which have the same external profile shape so that they constitute a smooth continuation both for the channels 5 and 6 for the drive belts, and for the lateral cavities 7 for sliding of the rollers 11 of the carriage which supports the awning fabric draw bar 12.

The guide connectors 21 are themselves connected, at the ends opposite those where they join the guides 4, to a pair of sectors 22, which extend around a portion of a circumference and which retain between them a curved continuity plate 23 which serves the function of creating a structural continuity independently of the mutual inclination between the two connectors 21, constituting the curves.

The sectors 22 create, on their outer periphery, a continuity for the guide channel 5 and, internally, have projecting spindles 26, with pulleys 27, which serve as guide and slide elements for the possible drive belts which slide in the lower channel 6 of the guides 4.

The elements described above are joined at each side by a first side plate 30 provided with a circular protuberance 31, which is super-imposed over the sectors 22, and, by a second side plate 32 the end of which is shaped with an arcuate curve 33 which is concentric with the circular curve of the protuberance 31.

The side plates 30 and 32 have through holes indicated 40 for receiving fixing screws which can be inserted into a connection plate which can be introduced into the interior of the grooves 8 in the guides 4.

The side plates 30 and 32 are symmetrically disposed on both sides of the guides 4 in such a way that it is possible to make the entire curve with a reduced number of component elements in that the curve itself is made with symmetrical elements. Moreover, a clamping bolt 50 is provided, which in practice constitutes the axis of rotation of the curve and which joins together the side plates 30 and 32 and the sectors 22 of the curve.

Further, an element 60 is provided which can be fixed on the curve, and which is provided with a pair of radially extending arms 61 which carry the support rollers 17. The element 60 is provided with circumferential slots 62 which allow it to be positioned in any angular orientation to obtain the best positioning of the fixing element 60 itself.

In particular the element 60 can be fixed to the inner side of the curve 20 (see also FIG. 1) by engaging its circular central opening on the curve protuberance 31 and engaging the circumferential slots 62, for example, with screw-nut assemblies (not shown). The screws would be threaded through the slots and holes formed through the upper circular part of the curve itself. Thus, upon assembly, the element 60 will be slightly rotated either in the clockwise or anti-clockwise direction in order to properly orient its arms 61 and hence, by screwing on the mentioned assemblies, it will be firmly coupled to the curve 20 itself.

The presence of the curve gives the possibility of varying the relative inclinations of adjacent sections of the guide 4 at will within wide margins without requiring any particular modifications in that the curve is able to create a structural continuity for the passage of the carriage 10 as well as for the belts moveable in the channels 5 and 6 so as to be able to effect motorisation of the drawing of the awning.

From what has been described above it will therefore be seen how the invention improves on the prior art and, in particular, it is to be emphasised that new criteria for the fixing of the guides to the supporting structure are introduced by utilising the square bar which makes the positioning of the guides independent of the fixing point.

Moreover, the structure utilised gives the possibility of employing a one-piece awning fabric even if the support frame has several spans. It is important also to emphasise that the structural realisation of the curve allows a continuous variation of the relative angle between the guides without creating any structural discontinuity. The embodiment of the invention described hereinabove by way of example can, of course, be replaced by any technically equivalent elements without departing from the scope of the invention defined hereinbelow.

I claim:

1. A support frame for an awning comprising brackets for attachment to a support structure, which brackets support a square bar on which are positioned attachment carriers mounted at the ends of guides on which are slidable carriages for a draw bar to which one end of an awning fabric can be attached, said draw bar lying above said guides over the whole of its longitudinal length to allow the use of a one-piece awning fabric, said awning fabric, at its other end, being wound on a wind-up roller rotatably supported by arms connected to said square bar, said guides having, in cross-section, a substantially rectangular conformation with channels for awning drive belts on the upper and lower faces thereof respectively, there further being provided lateral cavities within which slide said carriages supporting said awning fabric draw bar, as well as grooves for housing small bars joining said guides together, said awning fabric wind-up roller being supported by arms connected to said square bar by means of a splined hole, said frame further comprising, connected to said square bar, support elements which extend around said awning fabric wind up roller to support it part way along its length, support rollers extending transversely between laterally adjacent guides and operable to support the fabric of the awning in the span between said laterally adjacent guides, and, interposed between longitudinally adjacent guides, respective guide curves allowing the variation, with continuity, of the mutual inclination between said longitudinally adjacent guides, said guide curves having guide connectors which can be inserted into the interior of the guides to provide a structural continuity for the channels, as well as for said lateral cavities, respective ends of said guide connectors being pivotally engaged with a pair of guide sectors disposed opposite one another, there being further provided side plates including a first side plate provided with a circular protuberance adjacent which there is a second side plate provided with an arcuate recess matching the conformation of the protuberance, and a clamping bolt constituting a pivot axis of said curve, said connectors being symmetrically provided on either side of said curve.

2. A support frame for an awning, according to claim 1, further comprising a continuity connector interposed between said sectors and operable to create a continuity of support for belts in said channels independently of the mutual inclination of the elements constituting the curve.

3. A support frame for an awning, according to claim 1 wherein said sectors support spindles to which are rotatably connected pulleys over which passes a belt slidable in one of said channels.

4. A support frame for an awning, according to claim 1, further comprising a fixing element provided with radial arms for supporting said support rollers, said fixing element having arcuate slots for allowing adjustment of its angular position on said guide curve.

* * * * *